(12) United States Patent
Evertt et al.

(10) Patent No.: US 10,885,716 B1
(45) Date of Patent: Jan. 5, 2021

(54) MIXED REALITY SYSTEM USER INTERFACE PLACEMENT

(71) Applicant: Microsoft Technology Licensing, LLC, Redmond, WA (US)

(72) Inventors: Jeffrey J. Evertt, Kirkland, WA (US); Nazeeh A. Eldirghami, Redmond, WA (US); David C. Fields, Kirkland, WA (US); Kevin W. Barnes, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/459,252

(22) Filed: Jul. 1, 2019

(51) Int. Cl.

| | | |
|---|---|---|
| *G06T 19/00* | (2011.01) | |
| *G06F 3/0481* | (2013.01) | |
| *G06T 19/20* | (2011.01) | |
| *G06F 9/451* | (2018.01) | |
| *G06F 9/54* | (2006.01) | |

(52) U.S. Cl.
CPC .......... *G06T 19/006* (2013.01); *G06F 3/0481* (2013.01); *G06F 9/451* (2018.02); *G06F 9/54* (2013.01); *G06T 19/20* (2013.01); *G06T 2219/2004* (2013.01); *G06T 2219/2016* (2013.01)

(58) Field of Classification Search
CPC .......... G06F 9/451; G06F 3/0481; G06F 9/54; G06T 19/006; G06T 19/20; G06T 2219/2016; G06T 2219/2004
See application file for complete search history.

(56) References Cited

U.S. PATENT DOCUMENTS

| | | |
|---|---|---|
| 6,388,657 B1 | 5/2002 | Natoli |
| 10,223,832 B2 | 3/2019 | Geisner et al. |
| 10,225,655 B1 | 3/2019 | Falstrup et al. |
| 2011/0221668 A1 | 9/2011 | Haddick et al. |
| 2011/0227820 A1 | 9/2011 | Haddick et al. |
| 2013/0044128 A1* | 2/2013 | Liu ...................... G06T 19/006 345/633 |
| 2016/0018985 A1 | 1/2016 | Bennet et al. |
| 2017/0337035 A1 | 11/2017 | Choudhary et al. |

(Continued)

OTHER PUBLICATIONS

Kumparak, Greg, "Logitech is experimenting with a keyboard built for virtual reality", Nov. 3, 2017, 5 Pages. Retrieved from: https://web.archive.org/web/20171103013828/https:/techcrunch.com/2017/11/02/logitech-is-experimenting-with-a-keyboard-built-for-virtual-reality/.

*Primary Examiner* — Muhammad N Edun
(74) *Attorney, Agent, or Firm* — Mannava & Kang, P.C.

(57) ABSTRACT

A mixed reality display system determines a shared coordinate system that is understood by a mixed reality application running on the mixed reality display system and an operating system of the mixed reality display system. The operating system can display a system user interface (UI) element in a mixed reality environment. The system UI element can be displayed at a location in a mixed reality environment. The location is specified by the mixed reality application according to the shared coordinate system. A size and orientation for displaying the system UI element may also be specified. Also, the location, size and orientation may be specified through application program interfaces (API) of the operating system. API calls may be made per frame to adjust the location, size or orientation per frame of the displayed mixed reality environment.

19 Claims, 7 Drawing Sheets

(56) References Cited

U.S. PATENT DOCUMENTS

| | | | | |
|---|---|---|---|---|
| 2018/0174364 A1* | 6/2018 | Copic | ................... | G06F 3/011 |
| 2018/0197341 A1* | 7/2018 | Loberg | ................... | G06T 15/04 |
| 2018/0350150 A1 | 12/2018 | Powderly et al. | | |
| 2019/0065027 A1* | 2/2019 | Hauenstein | ............. | G06F 3/017 |
| 2019/0073109 A1 | 3/2019 | Zhang et al. | | |
| 2019/0113966 A1 | 4/2019 | Connellan et al. | | |

\* cited by examiner

MIXED REALITY SYSTEM USER INTERFACE PLACEMENT

BACKGROUND

Mixed reality is the result of blending the physical world with the digital world. Mixed reality is the next evolution in human, computer, and environment interaction and unlocks possibilities that before now were restricted to our imaginations. It is made possible by advancements in computer vision, graphical processing power, display technology, and input systems.

Many software applications require the use of the system keyboard to provide rich text input in a variety of languages. For virtual reality or augmented reality applications, most systems provide keyboard experiences that break the immersion of the user in the digital environment offered by these types of applications. For example, some virtual reality, or augmented reality applications require a user to remove a headset to use a physical keyboard to enter information. Others may require pausing the application to show a virtual keyboard in another environment, or may display a virtual keyboard over the top of content in the digital environment, so the keyboard often shows up at an undesirable location in the digital environment. All of these instances tend to degrade the user experience in the digital environment offered by these types of applications.

BRIEF DESCRIPTION OF DRAWINGS

Embodiments and examples are described in detail in the following description with reference to the following figures. The embodiments are illustrated by examples shown in the accompanying figures in which like reference numerals indicate similar elements.

DETAILED DESCRIPTION

Figure 1:
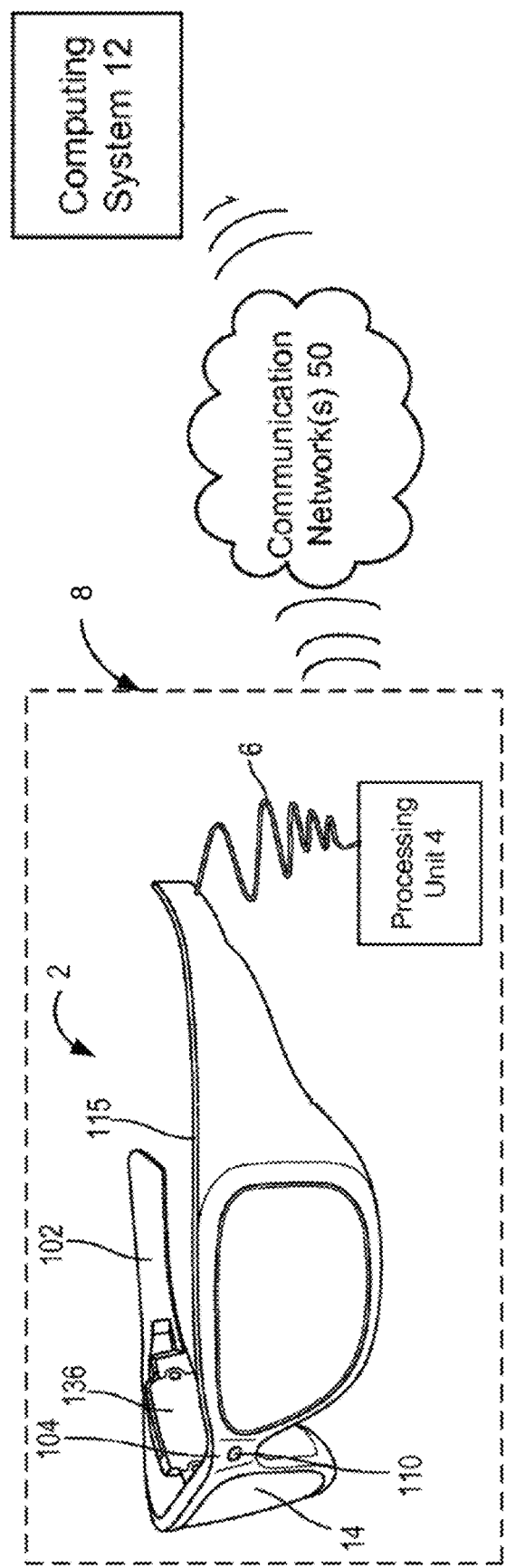
FIG. 1 is a block diagram depicting example components of a mixed reality display system, according to an embodiment.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

According to embodiments and examples of the present disclosure, systems and methods are described that allow a mixed reality application to express a location in a mixed reality environment where an operating system can place a system user interface (UI) element. A mixed reality application includes applications that may blend the physical world and the real world, including augmented reality and virtual reality applications. A mixed reality application, as used herein, may include a spectrum of applications, including applications that start with the physical world and place a digital object, such as a hologram, in a user's current view of the physical world, and applications that fully immerse the user in a digital world (e.g., virtual reality application). Mixed reality applications often rely on a headset or similar device to detect user movement and user input, including gaze, and to display a mixed reality environment that is responsive to user movement and user input. A mixed reality environment may include a blend of a user's physical environment, for example captured by a camera, and one or more digital objects placed in the physical environment, or may include a completely digital environment. Some examples of mixed reality applications may include applications for education that display three-dimensional digital objects in a classroom to allow students to gain a deeper understanding of the subject matter, or collaborative applications that may generate digital objects that represent humans collaborating on projects, or video games that immerse the player in a completely digital gaming environment with other players.

A mixed reality application runs on a platform including an operating system. In certain instances, the mixed reality application may require the use of a system keyboard or another type of user interface to obtain user input, such as rich text input in a variety of languages. As indicated above, according to an embodiment, a mixed reality application can express a location in a mixed reality environment where an operating system can place a system UI element. A system UI element for a mixed reality application refers to a UI digital object that can be placed in a mixed reality environment of a mixed reality application. A user may interact with the system UI element to provide user input. The system UI element is generated and displayed by the operating system instead of the mixed reality application. For example, the system UI element is not a digital object generated by the mixed reality application for display in the three-dimensional mixed reality environment. Instead, system UI elements may be native elements of the operating system UI that are generated and displayed in the mixed reality environment by the operating system. Examples of system UI elements may include but are not limited to a keyboard, a text box prompt for displaying voice commands, a trackball, or a game controller. System UI elements may include UI components that can afford clicking, dragging, moving, or any other operation that is supported by presenting the user with clear visual clues.

A shared coordinate system of the mixed reality environment is shared between the application and the operating system. This allows the mixed reality application to express to the operating system a location in the mixed reality environment to place the system UI element. In an embodiment, application program interfaces (APIs) may be used to express a shared coordinate system and a location in the shared coordinate system to place the system UI element. Also, size and orientation of the system UI element in the mixed reality environment may be expressed through the APIs. The mixed reality application may call one or more of the APIs every frame to update the location for placing the system UI element per frame.

A technical advantage of the systems and methods described herein is that the mixed reality application can control placement of the system UI element as needed. Accordingly, the mixed reality application may place the system UI element at a location that does not obstruct other digital or physical objects in the mixed reality environment, and the system UI element can be placed in a way that integrates well with the application content as opposed to obscuring it, improving the user experience.

Figure 2:
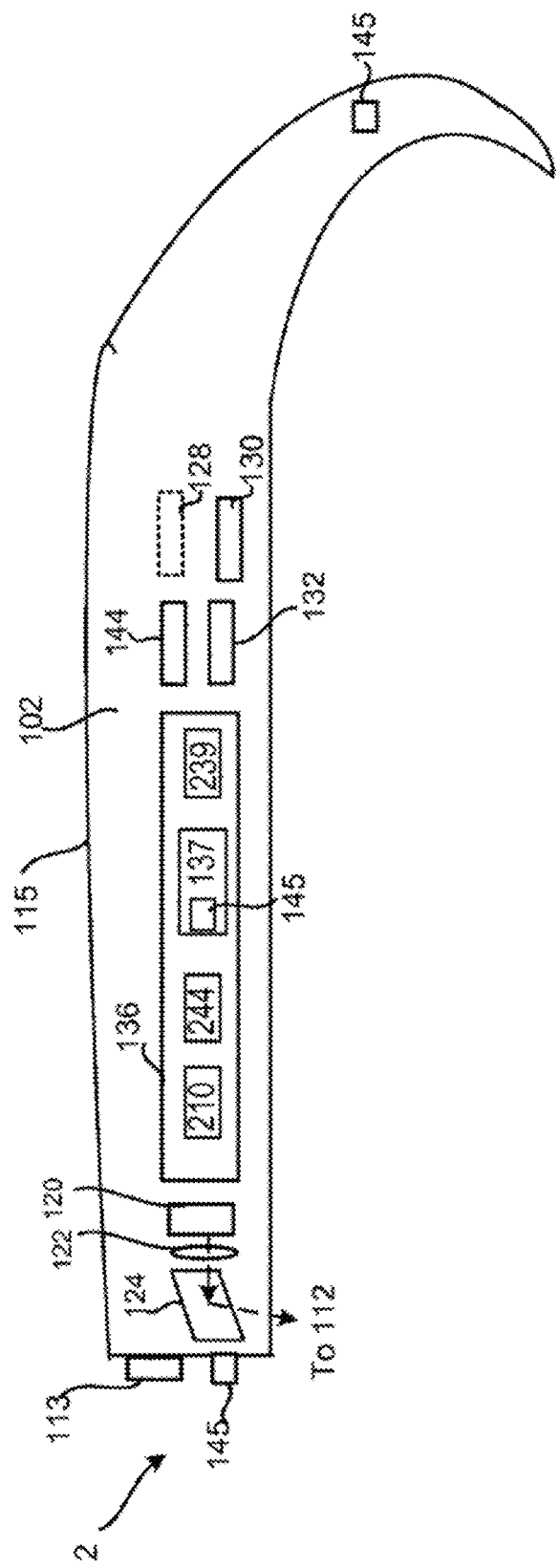
FIG. 2 shows components of a head mounted, display device, according to an embodiment.

FIG. 1 is a block diagram depicting example components of a mixed reality display system 8. The system 8 may include a display device, such as a head mounted display device, at least one computing device, such as a personal computer, video game console, smartphone, integrated processing unit, etc., and input devices and sensors for capturing things like a person's position in the world (e.g., head tracking), surfaces and boundaries (e.g. spatial mapping and spatial understanding), ambient lighting, environmental sound, object recognition, location and user input. For example, the system 8 may include a see-through display device as a head mounted display device 2 in communication with a processing unit 4 via a wire 6 in this example or wirelessly in other examples. In this embodiment, the head mounted, display device 2 is in the shape of eyeglasses in a frame 115, with a display optical system 14 for each eye in which image data is projected into a user's eye to generate a display of the image data while a user also sees through the display optical systems 14 for an actual direct view of the real world. Components of the display device 2 are further shown in FIG. 2 and the components in FIG. 2 are discussed below.

The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Each display optical system 14 is also referred to as a see-through display, and the two display optical systems 14 together may also be referred to as a see-through display.

Frame 115 provides a support structure for holding elements of the system 14 in place as well as a conduit for electrical connections. In this embodiment, the frame 115 provides a convenient eyeglass frame as support for the elements of the system discussed further below. The frame 115 includes a nose bridge portion 104 with a microphone 110 for recording sounds and transmitting audio data to control circuitry 136. A temple or side arm 102 of the frame rests on each of a user's ears. In this example, the right temple 102 includes control circuitry 136 for the display device 2.

The display device 2 may include cameras 113 and an image generation unit 120 for recording digital images and videos and transmitting the visual recordings to control circuitry 136, which may in turn send the captured image data to the processing unit 4, which may also send the data to one or more computer systems, such as computing system 12 over a network 50.

The processing unit 4 is a computing device and may take various embodiments. In some embodiments, the processing unit 4 is a separate unit which may be worn on the user's body, e.g. a wrist, or be a separate device like a mobile device, such as a smart phone. The processing unit 4 may communicate wired or wirelessly (e.g., Wi-Fi, Bluetooth, infrared, RFID transmission, wireless Universal Serial Bus (WUSB), cellular telecommunication, 3G, 4G or other wireless communication means) over a communication network 50 to a computing system 12 whether located nearby or at a remote location. In other embodiments, the functionality of the processing unit 4 may be integrated in software and hardware components of the display device 2. In another example, the processing unit 4 may include a personal computer, gaming system or another type of computer connected to the display device 2.

The system 8 may be connected to computing system 12 via one or more networks 50. The computing system 12 may be leveraged for processing power and remote data access. The computing system 12 may be implemented using one or more computer systems.

The control circuitry 136 provide various electronics that support the other components of head mounted display device 2. In this example, as shown in FIG. 2, the right temple 102 includes control circuitry 136 for the display device 2 which includes a processing unit 210, a memory 244 accessible to the processing unit 210 for storing processor readable instructions and data, a wireless interface 137 communicatively coupled to the processing unit 210, and a power supply 239 providing power for the components of the control circuitry 136 and the other components of the display system 2 like the cameras 113, the microphone 110 and sensor units. The processing unit 210 may comprise one or more processors including a central processing unit (CPU) and a graphics processing unit (GPU).

Inside, or mounted to temple 102, are ear phones 130, inertial sensors 132, and directional relative position sensors 145 at different positions on the temple 102. Optional electrical impulse sensor 128 detects commands via eye movements. In one embodiment, inertial sensors 132 include a three-axis magnetometer, a three-axis gyro and a three-axis accelerometer. The inertial sensors are for sensing position, orientation, and sudden accelerations of head mounted display device 2. From these movements, head position with respect to the ground may also be determined. In this embodiment, each of the devices using an analog signal in its operation like the sensor devices 144, 145, 128, 130, and 132 as well as the microphone 110 and an IR illuminator 134A discussed below, include control circuitry which interfaces with the digital processing unit 210 and memory 244 and which produces and converts analog signals for its respective device.

Mounted to or inside temple 102 is an image source or image generation unit 120 which produces visible light representing images. In one embodiment, the image source includes a microdisplay for projecting images of one or more virtual objects and coupling optics lens system 122 for directing images from microdisplay to reflecting surface or element 124. The microdisplay may be implemented in various technologies including transmissive projection technology, micro organic light emitting diode (OLED) technology, or a reflective technology like digital light processing (DLP), liquid crystal on silicon (LCOS) and Mirasol® display technology from Qualcomm, Inc. The reflecting surface 124 directs the light from the microdisplay into a lightguide optical element 112, which directs the light representing the image into the user's eye. Image data of a virtual object may be registered to a real object meaning the virtual object tracks its position to a position of the real object seen through the see-through display device 2 when the real object is in the field of view of the see-through displays 14.

In the illustrated embodiment, the head mounted display device 2 includes an integrated eye tracking and display system. The position of the user's eyes and image data of the eye in general may be used for gaze detection and blink command detection.

FIGS. 1-2 show an embodiment of a see-through head mounted display device 2. The see-through head mounted display device 2 may display a three-dimensional mixed reality environment that includes digital objects, also referred to virtual objects, and real-world objects that can be seen through the see-through head mounted display device 2. In other embodiments, the system 8 may include a non-see-through head mounted display device. For example, the system 8 may include a non-see-through head mounted display device for displaying a fully digital virtual reality environment.

Figure 3:
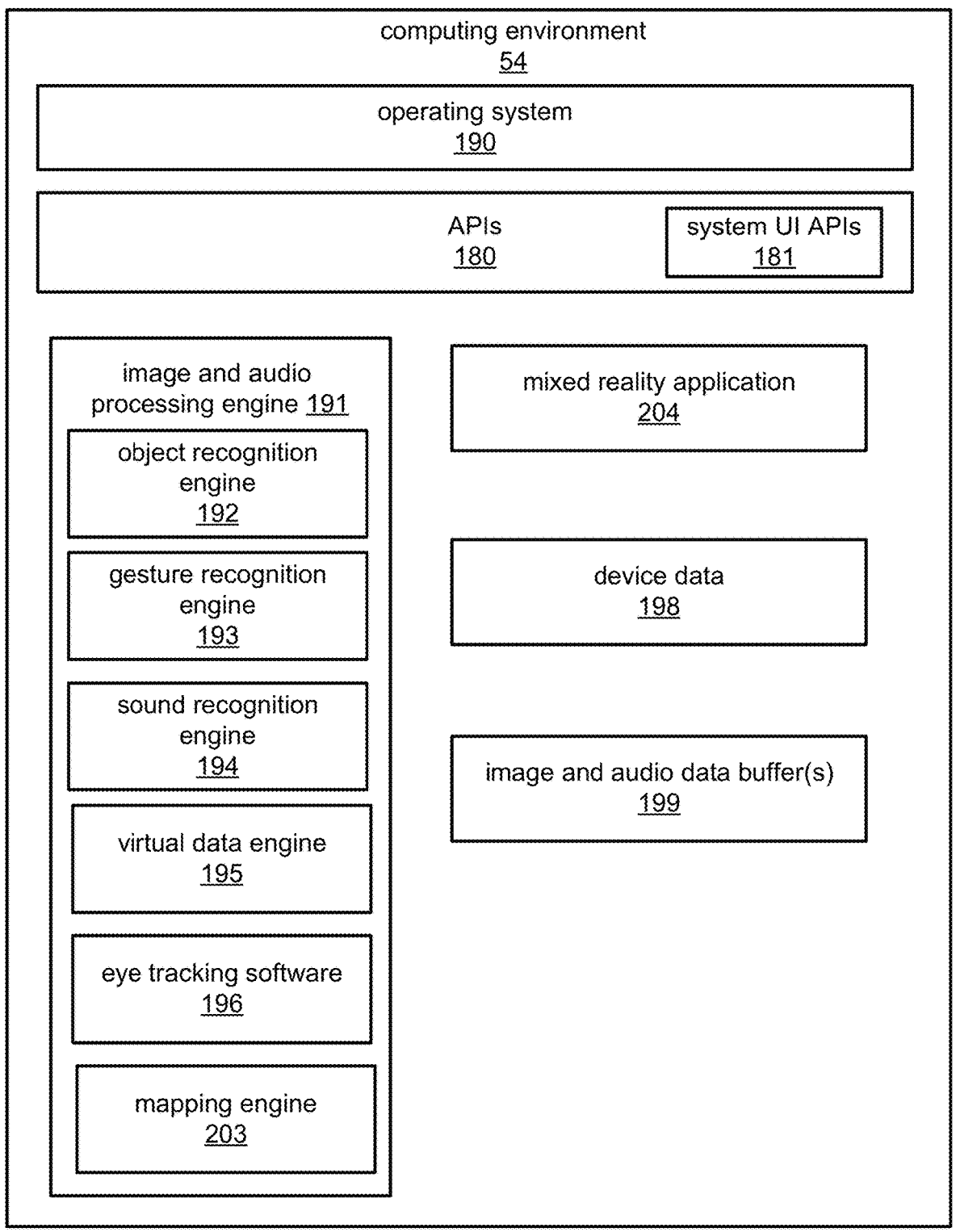
FIG. 3 is a block diagram depicting a computing environment for the mixed reality display system, according to an embodiment.

FIG. 3 illustrates a computing environment embodiment from a software perspective which may be implemented by the display system 8, the remote computing system 12 in communication with the display system 8 or both. The computing environment 54 may be implemented using one or more computer systems.

As shown in the embodiment of FIG. 3, the software components of a computing environment 54 include an operating system 190, APIs 180, an image and audio processing engine 191 and one or more mixed reality application, such as mixed reality application 204. The image and audio processing engine 191 includes object recognition engine 192, gesture recognition engine 193, sound recognition engine 194, virtual data engine 195, eye tracking software 196, and mapping engine all in communication with each other. The image and audio processing engine 191 processes video, image, and audio data captured by cameras, microphones and sensors for generating a mixed environment display on the see-through head mounted display device 2.

Virtual data engine 195 processes virtual objects and registers the position and orientation of virtual objects in relation to one or more coordinate systems. Additionally, the virtual data engine 195 performs the translation, rotation, scaling and perspective operations using standard image processing methods to make the virtual object appear realistic in the mixed reality environment displayed by the see-through head mounted display device 2. A virtual object position may be registered or dependent on a position of a corresponding real object. The virtual data engine 195 determines the position of image data of a virtual object in display coordinates. The virtual data engine 195 may also determine the position of virtual objects in various maps of a real-world environment stored in a memory unit of the display system 8 or of the computing system 12. One map may be the field of view of the display device with respect to one or more reference points for approximating the locations of the user's eyes. For example, the optical axes of the see-through display may be used as such reference points. In other examples, the real-world environment map may be independent of the display device, e.g. a three-dimensional map or model of a location (e.g. store, coffee shop, museum).

A mapping engine 203, which can process depth data or create stereo images from the image data captured by cameras 113 and any other cameras on the support structure, can create a three-dimensional model of a location which tracks stationary and moving objects in the location based on local object recognition of objects within a field of view of the see-through head mounted display device 2.

Upon detection of one or more objects by the object recognition engine 192, image and audio processing engine 191 may report to operating system 190 an identification of each object detected and a corresponding position and/or orientation which the operating system 190 passes along to an application, such as mixed reality application 204, and a mixed reality environment is displayed by the see-through head mounted display device 2 that may include virtual and/or real-world objects.

The sound recognition engine 194 processes audio received via microphone 110. The front facing cameras 113 in conjunction with the gesture recognition engine 193 implement a natural user interface (NUI) in embodiments of the display system 8. Gesture commands, such as finger or hand movements, may be detected as physical action user input. Blink commands or gaze duration data identified by the eye tracking software 196 are also examples of physical action user input. Voice commands may also supplement other recognized physical actions such as gestures and eye gaze.

The gesture recognition engine 193 can identify actions performed by a user which may indicate a control or command to an executing application. In an example, the gesture recognition engine 193 can identify figure movements for typing on a virtual keyboard in the mixed reality environment.

More information about the detection and tracking of objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about the gesture recognition engine 193 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

The computing environment 54 also stores data in image and audio data buffer(s) 199. The buffers provide memory for receiving image data captured from the front facing cameras 113, image data from an eye tracking components, buffers for holding image data of virtual objects to be displayed by the image generation units 120, and buffers for audio data such as voice commands from the user via microphone 110 and instructions to be sent to the user via earphones 130.

Device data 198 may include a unique identifier for the computer system of the display system 8, a network address, e.g. an IP address, model number, configuration parameters such as devices installed, identification of the operation system, and what applications are available in the display system 8 and are executing in the display system 8, etc. Particularly for a see-through, mixed reality display system, the device data may also include data from sensors or determined from sensors like directional position sensors, orientation sensors, microphone, etc.

The computing environment 54 may include one or more mixed reality applications, such as mixed reality application 204. The computing environment 54, including the operating system 190, may support a variety of types of mixed reality applications. For example, a mixed reality application may place digital information or content in a user's current environment. In another example, a mixed reality application may create a thin digital layer that can be completely overlaid on the user's space. The thin layer respects the shape and boundaries of the user's environment, but the application may choose to transform certain elements best suited to immerse the user in the application. In yet another example, a mixed reality application may completely immerse the user in a digital environment. For this type of application, once the user's space is identified, such as via the image and audio processing engine, an immersive environment is generated that may totally disregard the user's current physical environment and replace it with one of its own.

The operating system 190 may include a mixed reality platform, which provides holographic and mixed reality experiences with compatible head-mounted displays, such as shown in the display system 8. Mixed reality application 204 runs on the operating system 190 to provide a mixed reality experience for the user.

The APIs 180 may include a set of subroutine definitions, communication protocols, and/or tools for mixed reality applications that can run in the computing environment 54. Some examples of the APIs 180 may include APIs for perceiving the user's surroundings, so applications can locate and reason about the device relative to the surfaces and holograms around the user. The APIs 180 may include interfaces for device state, interfaces for tracking pose, interfaces for a camera and other sensors, an interface for model view transforms and projections for display, an interface for controlling rendering, an interface to get the system state, etc.

According to an embodiment, the APIs 180 may include system UI APIs 181 for placement of a system UI element in a mixed reality environment for the mixed reality application 204. One or more of the system UI APIs 181 may be called by the mixed reality application 204 to control placement of a system UI element, by the operating system 190, in the mixed reality environment at a location specified by the mixed reality application 204. The system UI APIs 181 may be called per frame. For example, frames per second (fps) refers to the number of unique images shown per second of video. For a smooth mixed reality experience, at least 60 fps or 90 fps is often used. Each frame may represent a current view of the user in the mixed reality environment. The current view of the mixed reality environment may change as the user moves or if the user's gaze changes or responsive to user input. Placement of a system UI element in the mixed reality environment may be controlled per frame via the system UI APIs 181. The system UI APIs 181 are further discussed below.

According to an embodiment, the system UI APIs 181 may be used to determine a shared coordinate system for the mixed reality application 204 and the operating system 190. For example, mixed reality applications place holograms in a mixed reality environment that look and sound like real objects. The mixed reality environment for example is a three-dimensional environment displayed to the user of the system 8 via display device 2. Placing the holograms involves precisely positioning and orienting those holograms at places in the mixed reality environment that are meaningful to the user, whether the mixed reality environment is their physical room or a virtual realm created by the application. When reasoning about the position and orientation of your holograms, or any other geometry such as the gaze ray or hand positions, the operating system 190 provides a real-world coordinate system in which that geometry can be expressed. The coordinate system may be expressed as a Cartesian coordinate system to determine and specify the positions and orientations of objects in the mixed reality environment. Such a coordinate system establishes 3 perpendicular axes along which to position objects: an X, Y, and Z axis. The Cartesian coordinate system can be either right-handed or left-handed.

The shared coordinate system may also include spatial anchors. A spatial anchor can mark an important point in the mixed reality environment that the system should keep track of over time. A location in the shared coordinate system can be defined relative to a spatial anchor using the Cartesian coordinate system and coordinate values representing distance. In an example, coordinate values may be expressed in meters and this means that objects placed 2 units apart in either the X, Y or Z axis will appear 2 meters apart from one another when rendered in the mixed reality environment.

The shared coordinate system is understood and used by both the mixed reality application 204 and the operating system 190. The mixed reality application 204 uses the shared coordinate system to specify a location for placing a system UI element in the rendered mixed reality environment, and the operating system 190 renders the system UI element at that location.

The system UI APIs 181 may be used to specify a shared coordinate system for the mixed reality application 204 and the operating system 190. Also, the system UI APIs 181 may be used to specify size and orientation of the system UI element. Also, the system UI APIs 181 may be called by the mixed reality application 204 per frame to control placement of a system UI element by frame in the rendered mixed reality environment.

Examples of the system UI APIs 181 are provided below. In the examples, the system UI element is a keyboard. However, it will be apparent to one of ordinary skill in the art that the system UI APIs 181 may be used to place other types of system UI elements.

The system UI APIs 181 may include APIs for getting an object that allows for override of the placement of a system UI keyboard and for resetting placement of the system UI keyboard. For example, a GetForCurrentView API gets an object that allows for override of the placement of the system UI keyboard in the mixed reality environment while the current view is visible. A ResetPlacementOverride API resets the placement of the system keyboard in the mixed reality environment to a predetermined location, such as a default location.

The system UI APIs 181 may include APIs for overriding the placement of the system UI keyboard in the mixed reality environment from a default position. For example, SetPlacementOverride (SpatialCoordinateSystem, Vector3, Vector3) is an API for overriding the placement of the system UI keyboard to appear at a stated location and orientation, while keeping its natural size, such as a default size. The parameters for this API allow a shared coordinate system to be specified (e.g., spatial coordinate system), and also include vectors for specifying a location for placement of the system UI keyboard (e.g., position of top-center of the keyboard in the spatial coordinate system) and for specifying an orientation of the system UI keyboard (e.g., normal of the keyboard). Vector3 indicates that position or orientation may be specified using three variables, such as X, Y, Z cartesian coordinates for position or location in the shared coordinate system.

Another API for overriding the placement of the system UI keyboard may also allow the mixed reality application 204 to control the size of the system UI keyboard. For example, SetPlacementOverride (SpatialCoordinateSystem, Vector3, Vector3, Vector2) overrides the placement of the system UI keyboard to appear at a specific position and orientation, setting a custom maximum keyboard size. The parameters are similar to the previous API example except an additional parameter may be used to specify the maximum size of the keyboard, such as length and width. For example, the system UI keyboard is generated up to the maximum size in the mixed reality environment according to an aspect ratio determined from the parameter. The above-mentioned APIs may be called by the mixed reality application 204 per frame to control placement of the system UI keyboard. When multiple types of system UI elements may be placed by the operating system 190 in the mixed reality environment, different sets of system UI APIs 181 may be used by the mixed reality application 204 to control placement of different types of system UI elements. In another example, the system UI APIs 181 may include parameters that allow the type of system UI element to be specified for controlling placement of a particular type of system UI element.

Figure 4A:
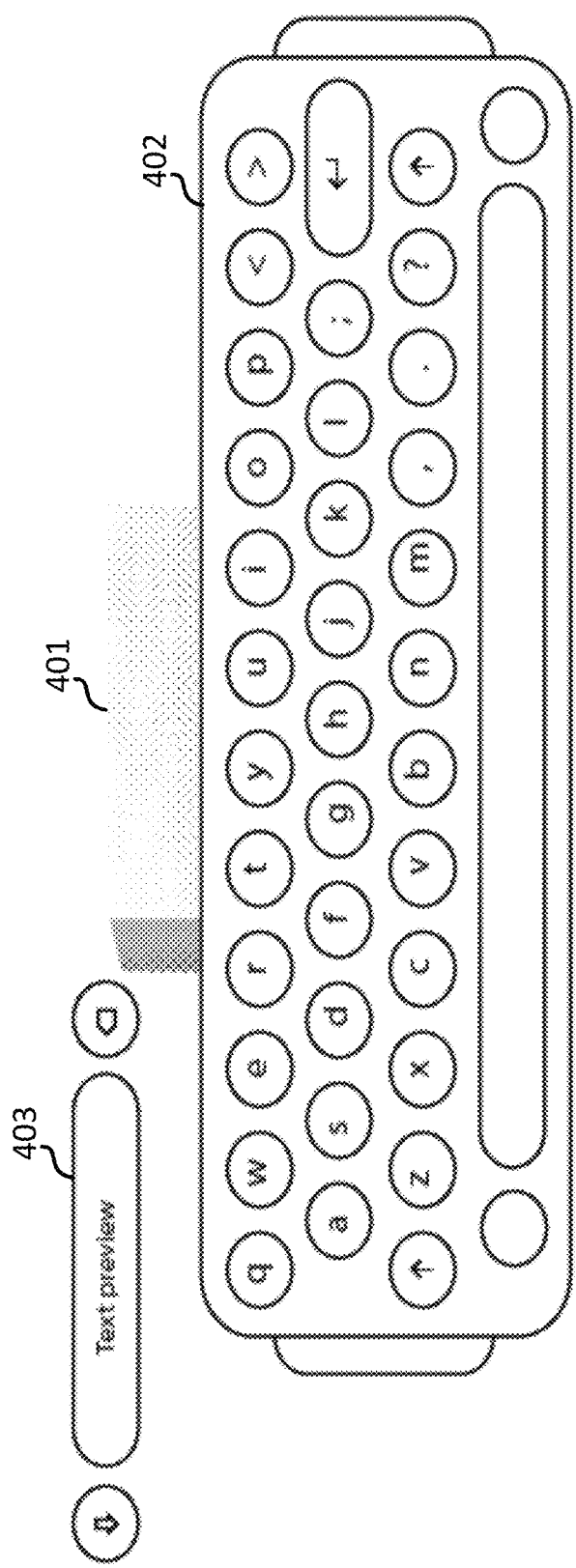
FIGS. 4A-B shows examples of placement of a system user interface element in a mixed reality environment.
Figure 4B:
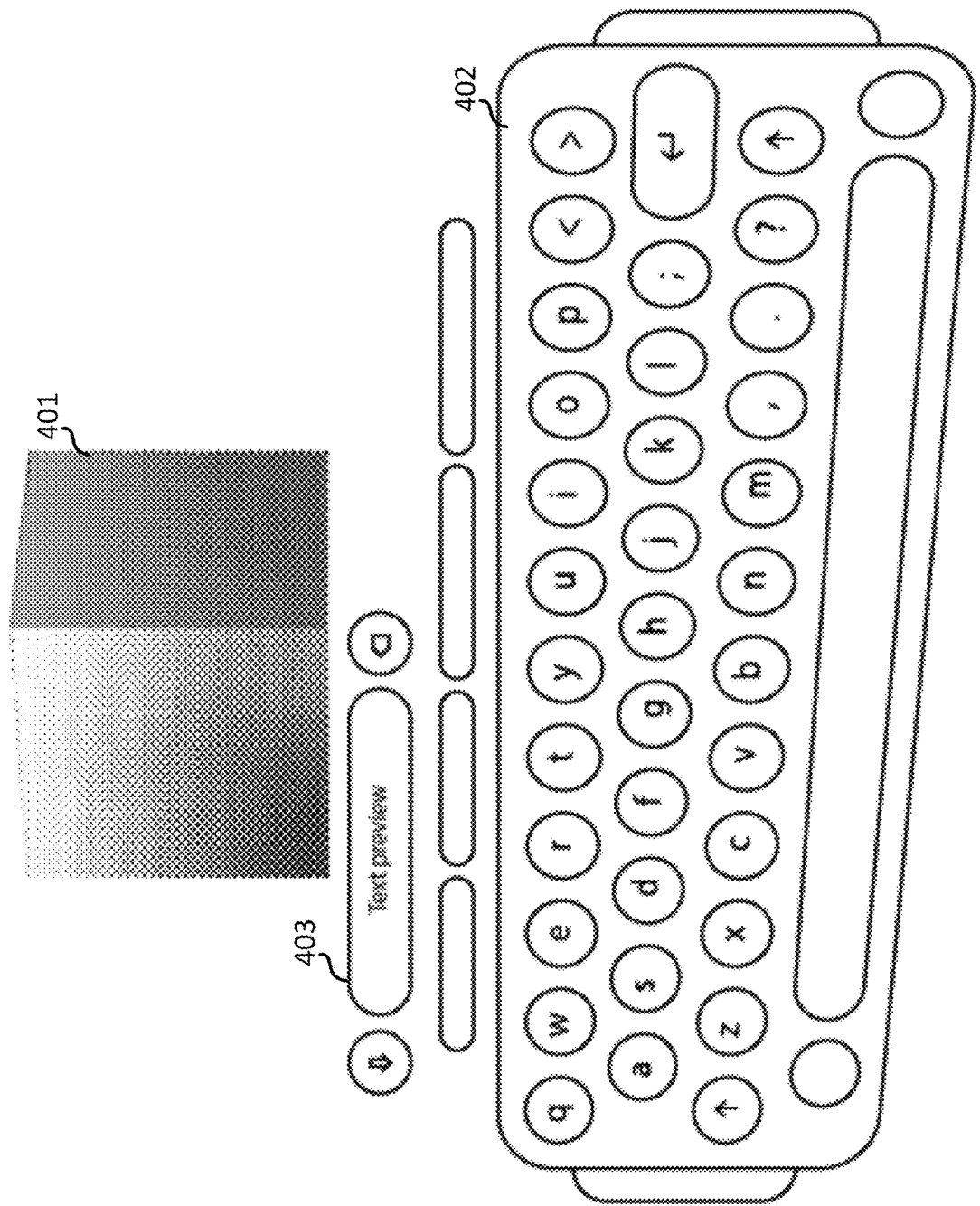

FIGS. 4A-B shows examples of placement of the system UI keyboard in a mixed reality environment. For example, FIG. 4A shows a current view of a mixed reality environment for the mixed reality application 204. The current view (e.g., current frame) includes a three-dimensional cube 401. The current view also includes the system UI keyboard 402 in a default position, which in this example is blocking the three-dimensional cube. The ResetPlacementOverride API may be used to reset placement of the system UI keyboard 402 to this position or location. Also, if the system UI APIs 181 were not available, this may be the only location where the operating system 190 places the system UI keyboard 402, which is this case is undesirable because it is blocking the content, e.g., cube 401, of the mixed reality application 204. Another example of a system UI element is also shown that includes a text box 403 that me be used to prompt for user input or to display text of voice commands.

FIG. 4B shows an example of using one or more of the system UI APIs 181 to override placement of the system UI keyboard 402 from a default location, such as shown in FIG. 4A. For example, the SetPlacementOverride (SpatialCoordinateSystem, Vector3, Vector3) API is called by the mixed reality application 204 to change the placement and orientation of the system UI keyboard 402 and text box 403 so they do not block the cube 401 and so they match the orientation of the cube 401. Here the system UI keyboard 402 is positioned below the important content of the mixed reality application 204, and system UI keyboard 402 is rotated to be flush with the cubes surface, per the application's request.

Figure 5:
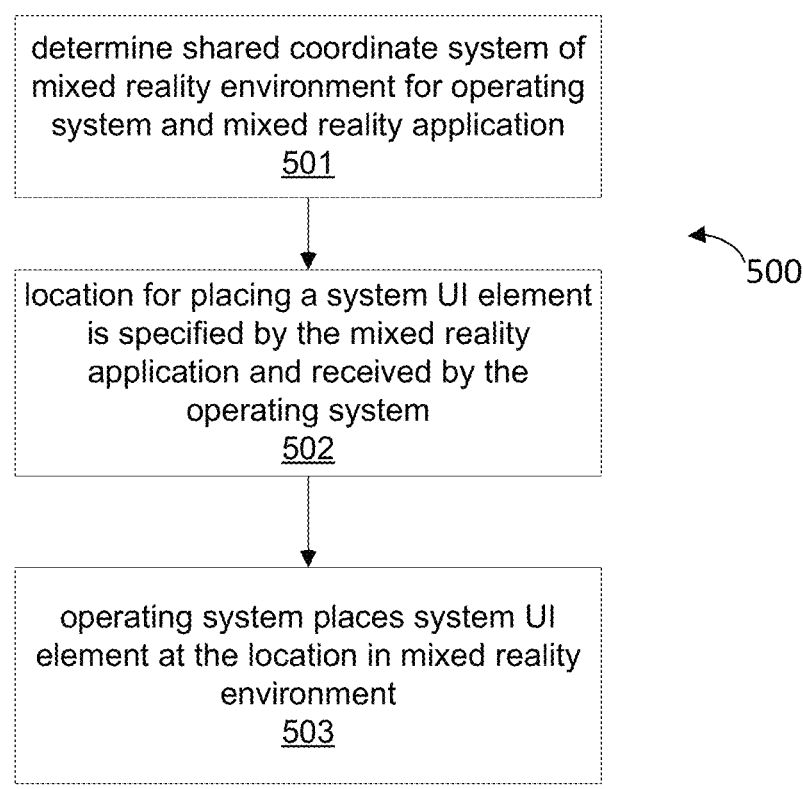
FIG. 5 shows a flow chart of a method, according to an embodiment.

FIG. 5 shows a flowchart of a computer-implemented method 500 that may be implemented by the system 8. At 501, a shared coordinate system understood by both the mixed reality application 204 and the operating system 190 is determined. In an example, parameters specifying the shared coordinate system is sent from the mixed reality application 204 to the operating system 190 via one or more of the system UI APIs 181, examples of which are described above. The parameters specifying the shared coordinate system may include a Cartesian coordinate system, spatial anchor, and a transform that defines a relationship between two objects in the mixed reality environment, such as a relationship between a spatial anchor and a digital object (e.g., hologram) in the mixed reality environment.

At 502, a location for placing a system UI element in the mixed reality environment is specified by the mixed reality application 204 and received by the operating system 190. For example, a system UI API is used by the mixed reality application 204 to express the location according to the shared coordinate system. For example, the mixed reality application 204 makes a system UI API call to request the operating system 190 to place the system UI element at the specified location. The operating system 190 receives the system UI API call with the location specified by the mixed reality application 204 to determine the location in the mixed reality environment for placing the system UI element.

At 503, the operating system 190 places the system UI element at the location in the mixed reality environment. For example, the system UI element is rendered, i.e., displayed, at the location in the mixed reality environment on the see-through head mounted display device 2.

The mixed reality application 204 may also specify orientation information and/or size information for placing the system UI element via the system UI APIs 181, such as described in the system UI APIs 181 examples above. Orientation information describes the desired orientation, such as relative one or more axes. Size information describes the desired size. In an example, the size information may include a maximum size, and the operating system 190 tries to display the system UI element at the maximum size or close to the maximum size while maintaining a desired or predetermined aspect ratio. The operating system 190 receives the API calls and causes the system UI element to be displayed at the specified location and at the specified orientation and size, if the orientation and size are specified through the API calls.

The operating system 190 may update the location, size and/or orientation of the rendered system UI element per frame. For example, the operating system 190 receives, from the mixed reality application 204, a request (e.g., system UI API call) to place the system UI element at a location per frame of the displayed mixed reality environment. Responsive to the received API call, the operating system 190, places the system UI element at the specified location for the respective frame. Size and/or orientation may also be specified per frame.

Figure 6:
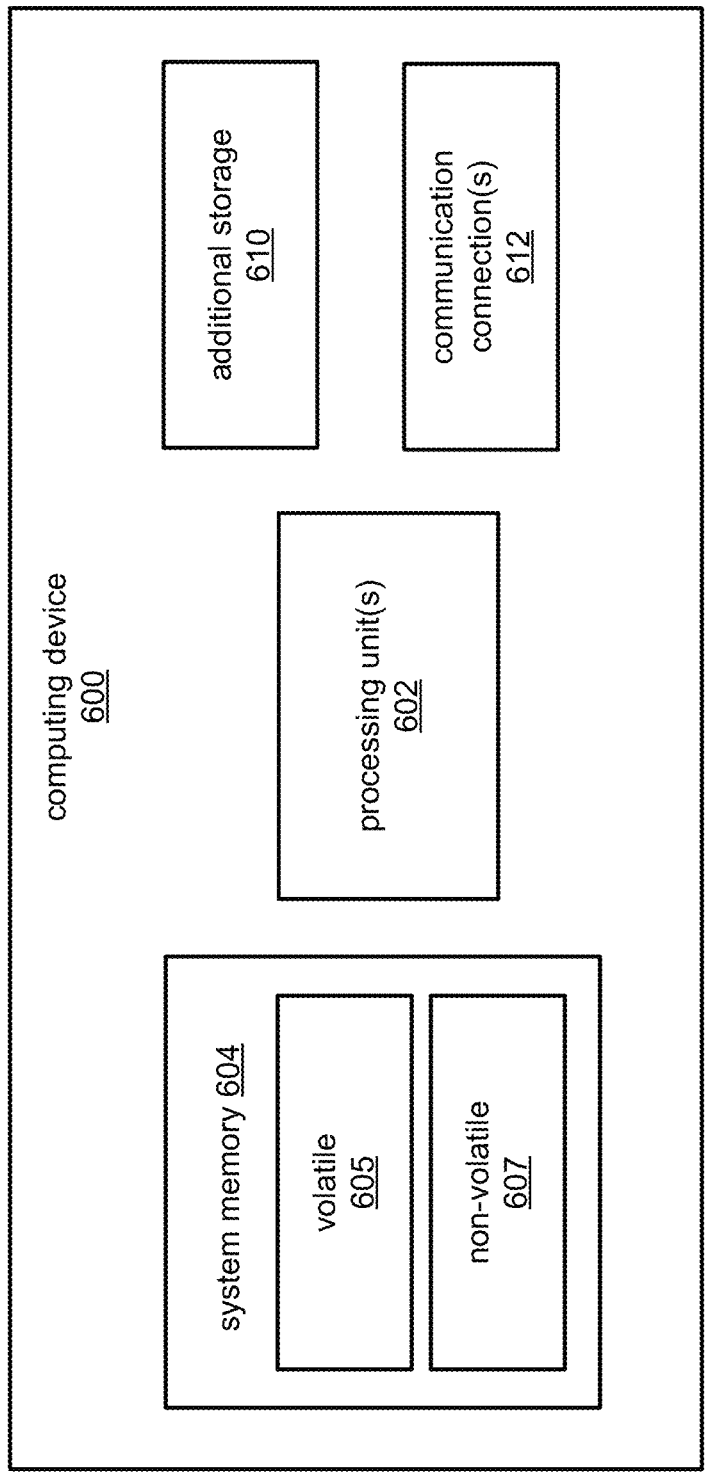
FIG. 6 shows a high-level diagram of a computing device, according to an embodiment.

FIG. 6 is a block diagram of a computing device 600 that can be used to the software components of computing environment 54. In an embodiment, the software components of computing environment 54 may be hosted and executed by one or more computing devices. In its most basic configuration, the computing device 600 may include one or more processing units 602, which may include different types of processors as well such as central processing units (CPU) and graphics processing units (GPU). The computing device 600 also includes a non-transitory computer readable medium that can store machine readable instructions executed by the processing units 602. For example, the computing device 600 includes memory 604. Depending on the exact configuration and type of computing device, memory 604 may include volatile memory 605 (such as RAM), non-volatile memory 607 (such as ROM, flash memory, etc.) or some combination of the two. Additionally, device 600 may also have additional features/functionality. For example, device 600 may also include additional storage 810 (removable and/or non-removable), such as hard disks or sold state storage. Device 600 may also contain communications connection(s) 612 such as one or more network interfaces and transceivers that allow the device 600 to communicate with other devices over a network. The communications connection(s) 612 may also include wired or wireless interfaces, such as Bluetooth or a universal service bus (USB) interface.

Embodiments and examples are described above, and those skilled in the art will be able to make various modifications to the described embodiments and examples without departing from the scope of the embodiments and examples.

What is claimed is:

1. A computing device for a mixed reality display system, the computing device comprising:
    at least one memory storing machine readable instructions; and
    at least one processor to execute the machine readable instructions to:
        determine a shared coordinate system in a mixed reality environment, wherein the shared coordinate system is shared between a mixed reality application and an operating system;
        receive, from the mixed reality application, a request to place a system UI element at a location for each frame of a plurality of frames of the mixed reality environment, wherein the location is expressed according to the shared coordinate system; and
        responsive to the request for each frame, place, by the operating system, the system UI element at the location in each frame.

2. The computing device of claim 1, wherein the at least one processor is to execute the machine readable instructions to:
    determine an orientation for placing the system UI element at the location based on orientation information provided by the mixed reality application; and
    cause, by the operating system, the system UI element to be displayed at the location in the determined orientation.

3. The computing device of claim 1, wherein the at least one processor is to execute the machine readable instructions to:
    determine a size of the system UI element based on size information provided by the mixed reality application; and
    cause, by the operating system, the system UI element to be displayed at the location in the determined size.

4. The computing device of claim 3, wherein the size information specifies a maximum size, and the system UI element is generated in the mixed reality environment up to the maximum size according to a predetermined aspect ratio.

5. The computing device of claim 1, wherein the at least one processor is to execute the machine readable instructions to:
    receive, from the mixed reality application, a request to reset the location of the system UI element to a predetermined location within the mixed reality environment; and
    place, by the operating system, the system UI element at the predetermined location.

6. The computing device of claim 1, wherein the system UI element comprises a keyboard, a text box prompt for displaying voice commands, a trackball, or a game controller.

7. The computing device of claim 1, wherein the system comprises a head mounted display device electrically connected to the computing device, wherein the system UI element is displayed in the mixed reality environment on the head mounted display device at the location.

8. The computing device of claim 7, wherein the computing device is integrated in the head mounted display device or is electrically connected to the head mounted display device via an interface.

9. A non-transitory computer readable medium storing machine readable instructions executable by a processor to:
    receive, at an operating system for a mixed reality display system, an application program interface (API) call from a mixed reality application that displays a mixed reality environment in the mixed reality display system, the API call specifying
        a shared coordinate system of a mixed reality environment, and
        a location in the shared coordinate system of the of a mixed reality environment for placing a system user interface (UI) element; and
    responsive to receiving the API call, display, by the operating system instead of the mixed reality application, the system UI element at the location in the mixed reality environment shown on a display device of the system.

10. The non-transitory computer readable medium of claim 9, wherein the machine readable instructions are executable by a processor to:
    determine, from the API call, an orientation for placing the system UI element at the location based on orientation information provided by the mixed reality application; and
    display the system UI element at the location in the determined orientation.

11. The non-transitory computer readable medium of claim 9, wherein the machine readable instructions are executable by a processor to:
    determine, from the API call, a size of the system UI element based on size information provided by the mixed reality application; and
    display the system UI element at the location in the determined size.

12. The non-transitory computer readable medium of claim 11, wherein the size information specifies a maximum size, and to display the system UI element at the location in the determined size comprises displaying the system UI element up to the maximum size according to a predetermined aspect ratio of the system UI element.

13. The non-transitory computer readable medium of claim 9, wherein the machine readable instructions are executable by a processor to:
    receive a second API call from the mixed reality application to reset the location of the system UI element to a predetermined location within the shared coordinate system of the mixed reality environment; and
    display, by the operating system, the system UI element at the predetermined location.

14. The non-transitory computer readable medium of claim 9, wherein the machine readable instructions are executable by a processor to:
    receive, from the mixed reality application, a subsequent API call for each frame of a plurality of frames of the mixed reality environment displayed on the display device,
        the subsequent API calls specifying locations in the shared coordinate system for placing the system UI element; and
    responsive to the subsequent API calls, display, by the operating system, the system UI element at the specified locations for the respective frames.

15. A computer-implemented method comprising:
    receiving, via an application program interface (API), a location in a shared coordinate system for placing a system user interface (UI) element in a frame of a mixed reality environment displayed, by a mixed reality application, on a display device of a mixed reality display system, the shared coordinate system understood by an operating system of the mixed reality display system and the mixed reality application, wherein the location is received by the operating system from the mixed reality application; and displaying, by the operating system instead of the mixed reality application, the system UI element at the location in the mixed reality environment shown on the display device.

16. The computer-implemented method of claim 15, comprising:

receiving, via the API, a location for a subsequent frame of the mixed reality environment for placing the system UI element, wherein the location is specified in the shared coordinate system; and updating the location of the displayed system UI element in the subsequent frame.

17. The computer-implemented method of claim 15, comprising:

receiving, via the API, an orientation for placing the system UI element at the location based on orientation information provided by the mixed reality application; and displaying the system UI element at the location in the orientation.

18. The computer-implemented method of claim 15, comprising:

receiving, via the API, a size of the system UI element based on size information provided by the mixed reality application; and displaying the system UI element at the location in the determined size.

19. The computer-implemented method of claim 18, wherein the size information specifies a maximum size, and to display the system UI element at the location in the determined size comprises displaying the system UI element up to the maximum size according to a predetermined aspect ratio of the system UI element.

\* \* \* \* \*